United States Patent [19]
Kanki et al.

[11] Patent Number: 5,755,622
[45] Date of Patent: May 26, 1998

[54] CENTRIFUGALLY OPERATED AXIAL AND TORSIONAL VIBRATION REDUCER FOR A DIAPHRAGM COUPLING

[75] Inventors: Hiroshi Kanki; Tadao Yashiki; Koichi Akagi; Taku Ichiryu, all of Takasago, Japan

[73] Assignee: Mitsubish Jukogyo Kabushiki Kaisha, Tokyo, Japan

[21] Appl. No.: 230,797

[22] Filed: Apr. 21, 1994

[30] Foreign Application Priority Data

Apr. 26, 1993 [JP] Japan ................ 5-121944
Apr. 27, 1993 [JP] Japan ................ 5-123584

[51] Int. Cl.$^6$ .................................... F16D 3/64
[52] U.S. Cl. ................ 464/99; 464/106; 464/147
[58] Field of Search .................. 464/99, 79, 80, 464/106, 147, 185

[56] References Cited

U.S. PATENT DOCUMENTS 1,606,514  11/1926  Crist ........................ 464/80
5,407,386  4/1995   Kish et al. ................ 464/99

FOREIGN PATENT DOCUMENTS 0 347 259  12/1989  European Pat. Off. .
1340668    9/1963   France ...................... 464/79
2 450 381  2/1980   France .
747 555    3/1944   Germany .
1 123 872  9/1962   Germany .
39 36 680  2/1991   Germany .
910707     11/1962  United Kingdom .
1001121    11/1967  United Kingdom ........... 464/99

*Primary Examiner*—John P. Darling
*Assistant Examiner*—Emmanuel M. Marcelo
*Attorney, Agent, or Firm*—Wenderoth, Lind & Ponack

[57] ABSTRACT

A vibration reducer for a diaphragm coupling is capable of suppressing axial vibrations as well as torsional vibrations. A diaphragm pack 3 is mounted between a diaphragm mount flange 2 provided on an intermediate shaft 1 serving as a drive shaft and a shaft flange 4 of another shaft serving as a driven shaft. An elastic arm 5 extends through the diaphragm pack 3 and is mounted to the diaphragm mount flange 2. The elastic arm 5 is a cylindrical member, whose circumferential portion is severed by slits formed by wire-cutting. Free ends 5a of the elastic arm 5 are expanded in the radial directions by centrifugal forces caused by rotation of a shafts and come into pressure-contact with the liner member 8 formed integrally within a cylindrical portion 7 of the shaft flange 4. A part of a torque is thereby transmitted via the pressure-contact portion, and rigidity in the axial direction of the elastic arm 5 is added to that of the diaphragm pack 3 to suppress vibrations. An alternative construction has a large pressure-contact force caused by centrifugal forces realized by making use of centrifugal weights 22, a centrifugal weight holder 23, and an elongated bolt 24.

20 Claims, 11 Drawing Sheets

5,755,622

1

CENTRIFUGALLY OPERATED AXIAL AND TORSIONAL VIBRATION REDUCER FOR A DIAPHRAGM COUPLING

BACKGROUND OF THE INVENTION

1. Field of the Invention

The present invention relates to a vibration reducer for a diaphragm coupling which is applicable to an output shaft system of a marine gas turbine.

2. Description of the Prior Art

Diaphragm couplings have been used in shaft systems of various rotary machines including an output shaft system of a marine gas turbine, as a flexible shaft coupling for absorbing or compensation for misalignment between axes.

One example of a diaphragm coupling in the prior art is shown in FIG. 17, and brief description will be made on the structure of the diaphragm coupling in the following. Diaphragm packs 3 are connected to respective opposite ends of an intermediate shaft 1. (In FIG. 17, only one end portion of the intermediate shaft 1 is illustrated.) To each diaphragm pack 3 is connected a shaft flange on a drive shaft side or a shaft flange 4 on a driven shaft side. In the case of a marine gas turbine, the shaft flange on the drive shaft side is connected to an output shaft of the gas turbine, and the shaft flange 4 on the driven shaft side is connected to a reduction gear.

In the case of a marine gas turbine, misalignment between axes and displacement in the axial direction would occur in a propeller shaft system due to oscillation of a hull caused by wave forces, but these are absorbed by a long intermediate shaft 1 and a pair of diaphragm packs 3. More particularly, the construction is such that the shaft system may be protected from respective external forces by tilting of the intermediate shaft 1 upon misalignment between axes and by elastic deformation of the diaphragm pack 3 upon displacement in the axial direction.

The diaphragm coupling composed of a pair of diaphragm packs and an intermediate shaft would vibrate in the axial direction at the time of operation. The natural frequency of the diaphragm coupling is high, as the rigidity of the diaphragm pack is large. However, in the case where the rigidity is large, the capability of the diaphragm coupling to operate as a flexible coupling is lowered, and an unreasonable vibration strain occurs in the shaft system. Therefore, the diaphragm coupling is designed in such manner that its natural frequency may be maintained lower than a normal number of revolutions, but it is used over a wide range of numbers of revolutions as is often the case with a marine turbine. Due to resonance at this time, not only would the diaphragm pack be damaged, or inconvenience would occur because the operation would be stopped because of an alarm detecting large vibrations, but in some cases there was a fear that bearings would be damaged.

SUMMARY OF THE INVENTION

It is therefore one object of the present invention to provide a vibration reducer for a diaphragm coupling which can sufficiently suppress axial vibration and torsional vibration as a flexible coupling while enhancing rigidity in the axial direction.

In order to achieve the above-mentioned object, according to one feature of the present invention, there is provided a novel vibration reducer for a diaphragm coupling disposed between a drive shaft and a driven shaft in a shaft system whose rotational speed varies over a wide range, such as a marine gas turbine. A cylindrical portion is provided with a flange of either one of a drive shaft and a driven shaft, and a pressure-contact means is mounted to a flange of the other shaft and can be brought into pressure-contact with an inner circumferential surface of the above-mentioned cylindrical portion when subjected to a centrifugal force caused by rotation of the same shaft.

According to the present invention, as a result of disposition of the above-featured vibration reducer in a diaphragm coupling, when the above-mentioned shaft system rotates, the pressure-contact means deforms outwards and is brought into pressure contact with the inner circumferential surface of the aforementioned cylindrical portion. Under this condition, a part of a torque is transmitted from the drive shaft to the driven shaft via the pressure-contact means. Since the rigidity in the axial direction of the pressure-contact means is added to the diaphragm pack, the rigidity in the axial direction of the diaphragm pack becomes large and it serves to suppress axial vibration of the diaphragm pack.

According to another feature of the present invention, there is provided the above-featured vibration reducer for a diaphragm coupling wherein a liner made of rubber or a hard alloy is disposed on the inner circumferential surface of the cylindrical portion or the inner circumference of the cylindrical portion is subjected to a hardening treatment. Alternatively, split pieces of a liner made of rubber or a hard alloy or an annular integrated rubber member is fixedly secured to the outer circumferential surface of the pressure-contact means.

The above-featured alternative structures of the vibration reducer can be selectively employed depending upon a bearing pressure between the pressure-contact means and the inner circumferential surface of the cylindrical portion. More particularly, in the case where the bearing pressure is small, a coefficient of friction is increased by employing a liner made of rubber or an annular integral rubber member, while on the contrary, in the case where a bearing pressure is large, a wear and abrasion resistance is improved by employing a hard alloy liner or a hardening treatment. Thereby, a balance between torque transmission and durability can be controlled.

In the above-featured construction of a vibration reducer, in the case where rubber is employed as a liner, if the rubber liner is stuck onto the inner circumferential surface of the cylindrical portion, it is expected that the rubber liner would compress in itself due to centrifugal forces (by the amount corresponding to the decrement of the Young's modulus) and would become thinner. However, in the case of a rubber member or members stuck onto the outer circumferential surface of the pressure-contact means, on the contrary, since it would expand due to centrifugal forces, an effect of increasing frictional forces in supplement to the displacement of the pressure-contact means can be expected.

Furthermore, if the outer circumferential surface of the pressure-contact means is made harder than the inner circumferential surface of the cylindrical portion as by fixedly securing split pieces of a hard alloy liner to the outer circumference of the pressure-contact means, and if the inner circumferential portion of the cylindrical portion is constructed as a separable structure, since wear and abrasion would occur on the side of the inner circumferential surface of the cylindrical portion, there is no need to replace the pressure-contact means that was subjected to expensive working such as wire cutting, and is economical.

In addition, in the vibration reducer according to the present invention preferably has a pressure-contact slide portion between the pressure-contact means and the inner circumferential surface of the cylindrical portion positioned at the center in the axial direction of the diaphragm pack.

According to this preferable construction, when shafts have tilted with the diaphragm pack used as a fulcrum point, these shafts would tilt around the center in the axial direction of the diaphragm pack, and a slide distance at the pressure-contact slide portion in the axial direction would become a minimum, depending only opon an angular displacement.

Moreover, in such cases it is preferable to mount an O-ring or O-rings at the pressure-contact slide portion of the pressure-contact means.

By employing such a construction, maintenance of the pressure-contact means becomes easy, because it is merely necessitated to replace only the O-rings even if the slide portion should be worn and abraded.

As one preferable mode of embodiment of the pressure-contact means in the vibration reducer according to the present invention, an elastic arm can be employed. The elastic arm could be constructed as a cylindrical member having a plurality of axial slits formed in its circumferential portion by wire cutting so that the free end portions of its sections, split by the slits, may be expanded and projected in the radial directions by centrifugal forces caused by rotation.

Furthermore, as another preferable mode of mode embodiment of the pressure-contact means in the vibration reducer according to the present invention, the pressure-contact means could be constructed of centrifugal weights adapted to be brought into pressure-contact with the above-mentioned cylinder portion when subjected to centrifugal forces. A centrifugal weight holder serves as a guide for the above-mentioned centrifugal weights, an elongated bolt holds the above-mentioned centrifugal weight holder, a sleeve is formed integrally with the above-described cylindrical portion for holding one end of the aforementioned elongated bolt, and a bolt holder is formed integrally with a flange of a driven shaft or a drive shaft for holding the other end of the above-mentioned elongated bolt. In this connection, a rubber liner is preferably interposed between the above-mentioned cylindrical portion and the sleeve.

If the above-described construction of the pressure-contact means is employed, when the shaft system rotates, the centrifugal weights would be projected in the radial directions by the centrifugal forces and they would come into pressure-contact with the inner circumferential surface of the above-mentioned cylindrical portion. Consequently, it becomes possible to realize a large pressure-contact force, hence the rigidity in the axial direction additionally given to the diaphragm pack is also enlarged, and thereby vibration in the axial direction of the diaphragm coupling can be surely suppressed.

In addition, owing to the rubber liner interposed between the above-mentioned cylindrical portion and the sleeve, a tilt of the diaphragm coupling can be absorbed by the rubber liner and the elongated bolt, and so fatigue stress would not be generated at all.

It is to be noted that preferably the vibration reducer according to the present invention is provided also on the other side of the drive shaft, because the axial vibration suppressing effect can be further improved.

BRIEF DESCRIPTION OF THE DRAWINGS

The above-mentioned and other objects, features and advantages of the present invention will become more apparent by reference to the following description of a number of preferred embodiments of the present invention taken in conjunction with the accompanying drawings.

In the accompanying drawings.

In these figures, corresponding component parts are given like reference numerals.

DESCRIPTION OF THE PREFERRED EMBODIMENTS

Figure 1:
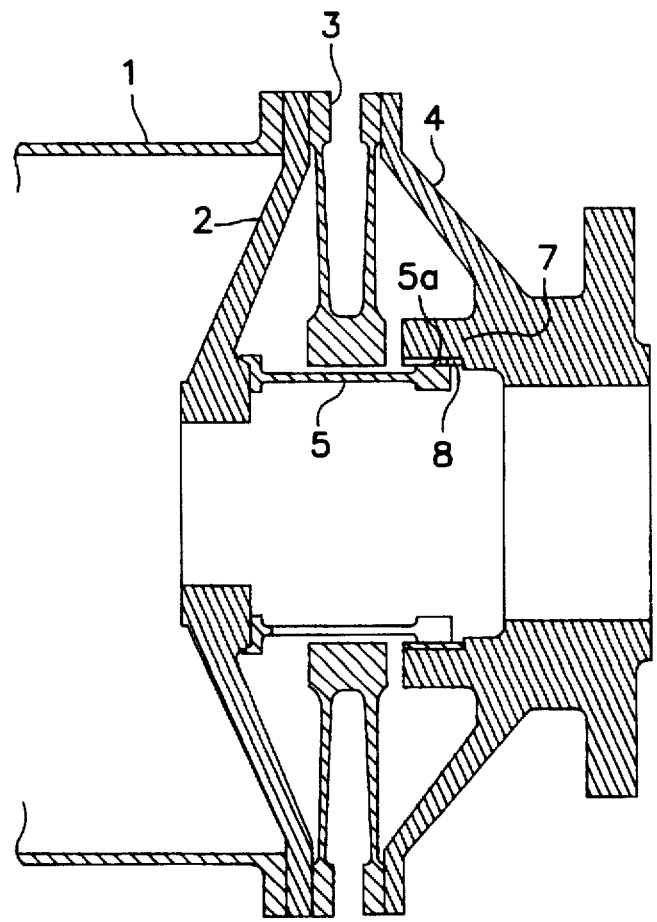
FIG. 1 is a cross-sectional view of a vibration reducer for a diaphragm coupling according to a first preferred embodiment of the present invention.
Figure 2:
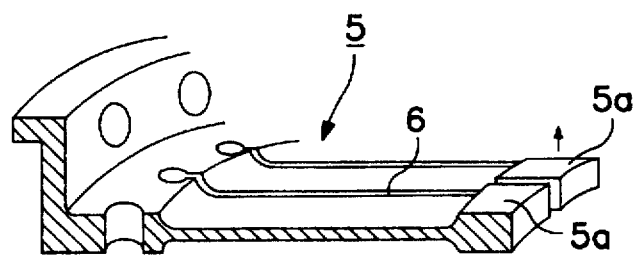
FIG. 2 is a partial perspective view showing one example of configurations of elastic arms included in the vibration reducer in FIG. 1.

FIGS. 1 and 2 illustrate a first preferred embodiment of the present invention, in which a diaphragm mount flange 2 has an elastic arm 5 mounted thereto and extending through a diaphragm pack 3. This elastic arm 5 has, as shown in the partial perspective view of FIG. 2, slits 6 cut by wire-cutting in a circumferential portion of a cylindrical member, and it is constructed in such manner that upon operation respective free ends 5a of the split portions may be expanded and projected in the radial directions (indicated by a dash-line arrow in FIG. 2) by centrifugal forces. On the other hand, on a shaft flange 4 on a driven side is integrally formed a cylindrical portion 7, and on an inner circumferential portion of the same cylindrical portion 7 is integrally provided a liner member 8. This liner member 8 could comprise rubber stuck onto the inner circumferential portion or a hard alloy liner press-fitted into the inner circumferential portion. Otherwise, in place of the hard alloy liner member 8, the inner circumferential portion of the cylindrical portion 7 could be subjected to hardening treatment. The inner diameter of the cylindrical portion 7, that is, the inner diameter of the liner member 8 or the inner diameter of the cylindrical portion after hardening treatment, is set at a value such that the free ends 5a of the elastic arm 5 can be fitted thereto when stopped from rotating. In general, by machining them with a tolerance of a scope such that a clearance of about 0.01 mm at maximum to an interference of about 0.05 mm at maximum is produced, the amount of bending expansion of the free ends 5a towards the inner surface of the liner member 8 at the time of operation can be made sufficiently larger than this clearance, and with such a degree of interference, that insertion of the elastic arm 5 at the time of assembly can be easily achieved.

By employing the above-described construction, the free ends 5a of the elastic arm 5 when subjected to centrifugal forces would bend and expand outwards and come into pressure-contact with the inner circumferential surface of the cylindrical portion 7 of the shaft flange 4. Thereby, a part of the torque transmitted from an intermediate shaft 1 to the shaft flange 4 on the side of the driven shaft via the diaphragm pack 3 is also transmitted via the pressure-contact portions between the free ends 5a of the elastic arm 5 and the liner member 8 to the same shaft flange 4. Accordingly, a rigidity in the axial direction of the elastic arm 5 is added to that of the diaphragm pack 3, and so vibration in the axial direction of the diaphragm can be suppressed.

In this connection, it is to be noted that use of a rubber member as the liner member 8 is favorable in the case where a surface contact pressure at the pressure-contact portion is small. In this case, a coefficient of friction at the pressure-contact portion can be enhanced, and a relative displacement between the free ends 5a and the liner member 8 can be absorbed by the elasticity of the rubber. On the other hand, the use of a hard alloy liner for the liner member 8 is favorable in the case where the surface contact pressure at the pressure-contact portion is large. In this case, wear and abrasion resistance at the pressure-contact portion can be improved. It is to be noted that the merit of a hardening treatment of the inner circumferential portion of the cylindrical portion 7 are quite similar to those in the case of employing a hard alloy liner.

Figure 3:
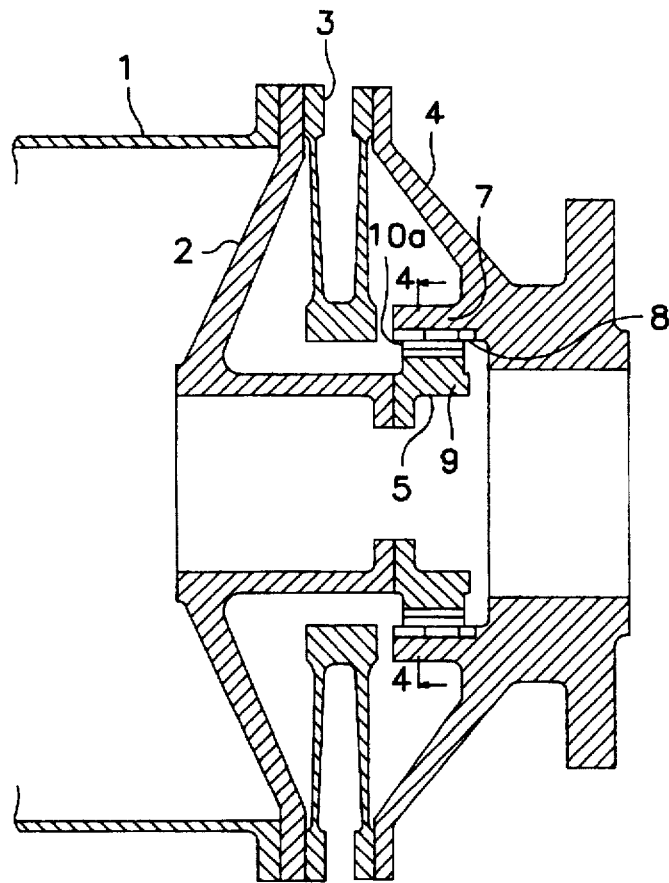
FIG. 3 is a cross-sectional view of a vibration reducer for a diaphragm coupling according to a second preferred embodiment of the present invention taken along line B—B in FIG. 4.
Figure 4:
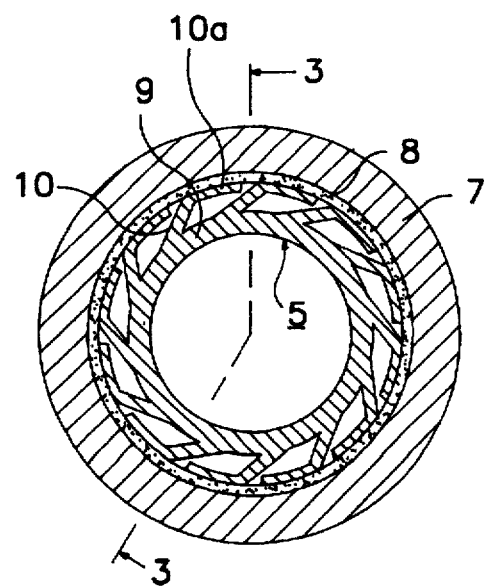
FIG. 4 is a transverse cross-sectional view taken along line A—A in FIG. 3.

Next, FIGS. 3 and 4 illustrate a second preferred embodiment of the present invention, in which an elastic arm 5 is formed of elastic pieces 10 provided on an outer circumference of a boss 9 by wire-cutting. With this construction, free ends 10a of the elastic pieces 10 are brought into pressure-contact with a liner member 8 as a result of centrifugal forces, and hence a suppression of vibration can be realized by a similar action to that of the above-described first preferred embodiment.

Figure 5:
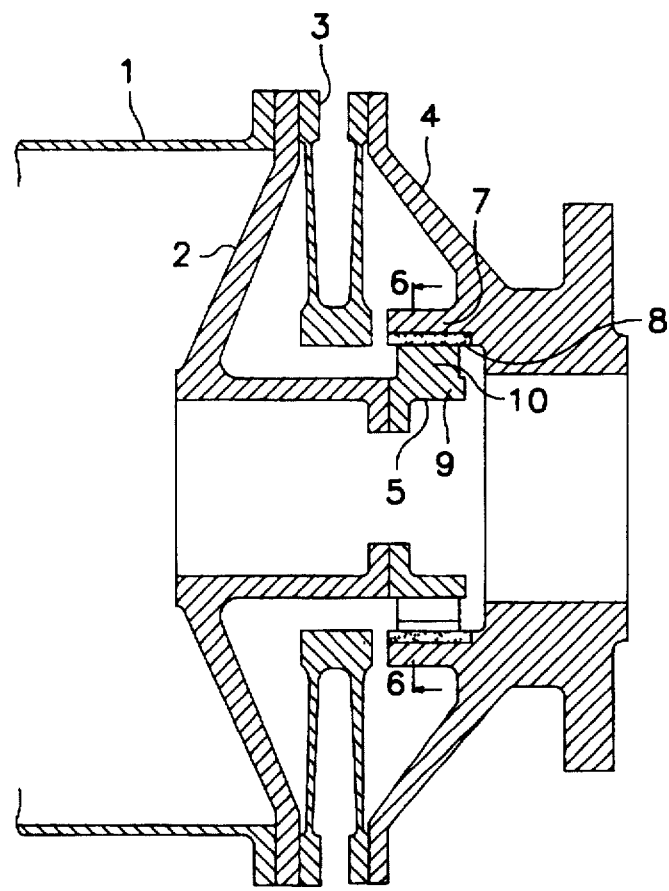
FIG. 5 is a cross-sectional view of a vibration reducer for a diaphragm coupling according to a third preferred embodiment of the present invention taken along line D—D in FIG. 6.
Figure 6:
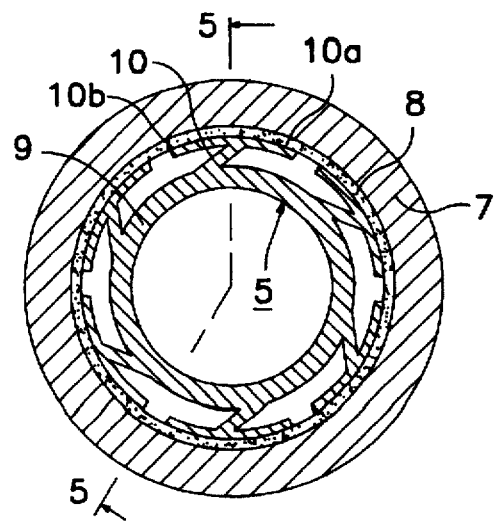
FIG. 6 is a transverse cross-sectional view taken along line C—C in FIG. 5.

A third preferred embodiment of the present invention illustrated in FIGS. 5 and 6 involves a modification of the elastic pieces 10 in the second preferred embodiment. More particularly, in contrast to the fact that the free ends 10a of the elastic pieces 10 in the second preferred embodiment are formed as bent in one circumferential direction (i.e., in the clockwise direction as viewed in FIG. 4), in the third preferred embodiment, free ends 10a and 10b of the respective elastic pieces 10 are formed bent in both circumferential directions. With this modified construction of the elastic pieces 10, vibration suppression similar to that of the other preferred embodiments as described above can also be realized.

Figure 7:
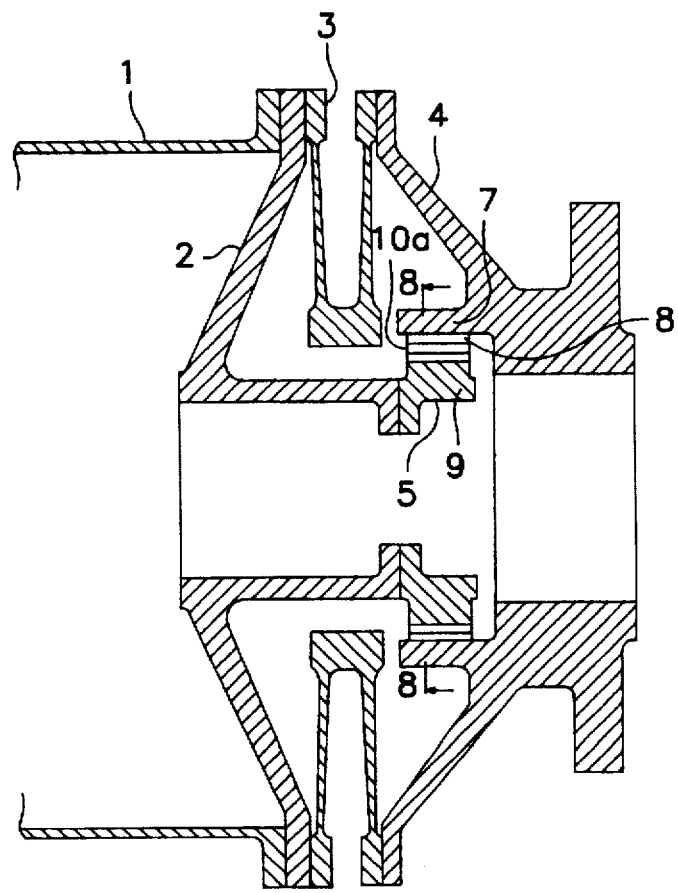
FIG. 7 is a cross-sectional view of a vibration reducer for a diaphragm coupling according to a fourth preferred embodiment of the present invention taken along line F—F in FIG. 8.
Figure 8:
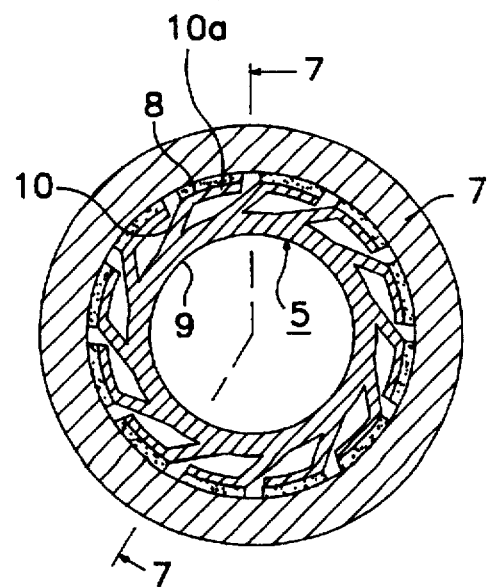
FIG. 8 is a transverse cross-sectional view taken along line E—E in FIG. 7.

In succession, FIGS. 7 and 8 illustrate a fourth preferred embodiment of the present invention, in which a liner member 8 is severed into a plurality of liner pieces and the severed liner pieces are integrally formed on the outer circumference of the free ends 10a of the respective elastic pieces 10. For the liner member 8 in this case, either a rubber liner or a hard alloy liner could be selectively employed, depending upon the surface pressure at the pressure-contact portion, similar to the case where a liner member is provided on the side of a cylindrical portion 7 of a shaft flange 4.

Figure 9:
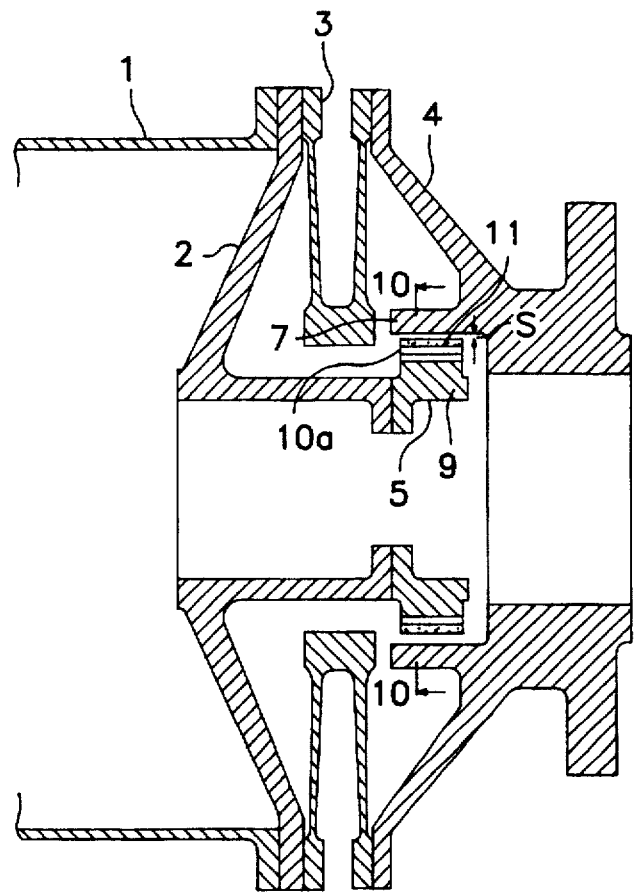
FIG. 9 is a cross-sectional view of a vibration reducer for a diaphragm coupling according to a fifth preferred embodiment of the present invention taken along line H—H in FIG. 10.
Figure 10:
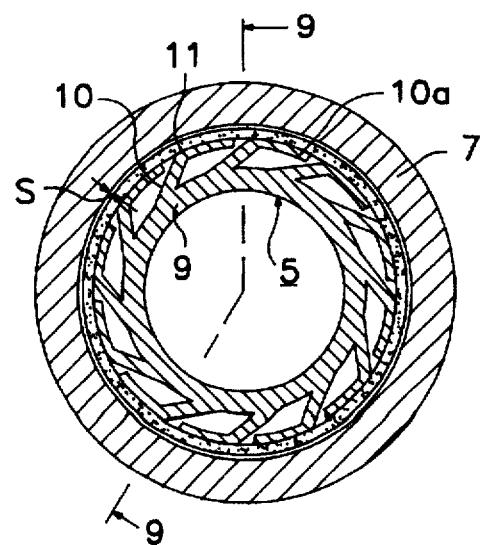
FIG. 10 is a transverse cross-sectional view taken along line G—G in FIG. 9.

In a fifth preferred embodiment illustrated in FIGS. 9 and 10, in place of the liner member 8 in the fourth preferred embodiment, an annular rubber member 11 is integrally formed along the outer circumferences of the free ends 10a of the elastic pieces 10. It is to be noted that in these figures, the diaphragm coupling is shown in a state in which it is stopped (stationary). Hence a gap space S is provided between the outer circumference of the annular rubber member 11 and the inner circumference of the cylindrical portion 7 of the shaft flange 4. With this construction of the vibration reducer, also vibration suppression similar to that of the other preferred embodiments described above can be realized.

Figure 11:
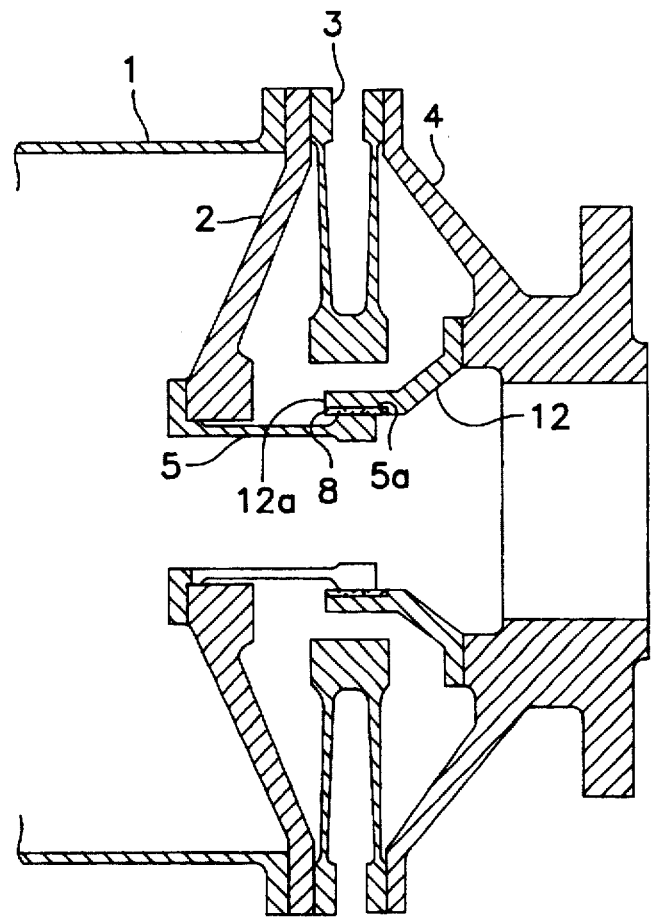
FIG. 11 is a cross-sectional view of a vibration reducer for a diaphragm coupling according to a sixth preferred embodiment of the present invention.

FIG. 11 shows a sixth preferred embodiment of the present invention, in which a pressure-contact portion between an elastic arm 5 and a liner member 8 is positioned at the center, in the axial direction, of a diaphragm pack 3. To that end, in this particular construction, a rigid arm 12 projecting from a shaft flange 4 towards the center of the axis of the diaphragm pack 3 is mounted to the shaft flange 4 so that a cylindrical portion 12a at the free end of the same rigid arm 12 may be positioned at the center in the axial direction of the diaphragm pack 3. It is to be noted that a liner member 8 is provided integrally with the inner circumferential portion of the free end cylindrical portion 12a. For that member either a rubber a hard alloy liner or hardening treatment of the inner circumferential portion could be selectively employed similar to the other above-described preferred embodiments.

Figure 12:
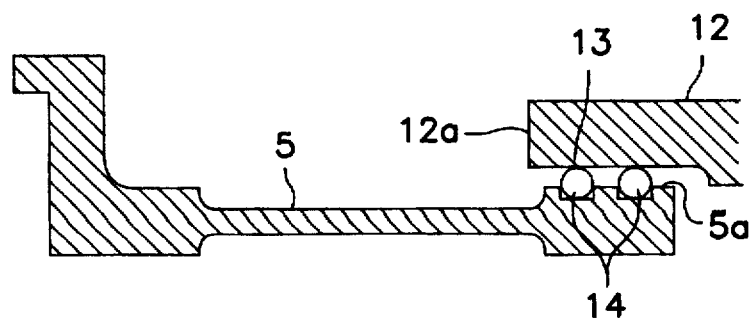
FIG. 12 is a partial cross-sectional view showing a modified embodiment for a pressure-contact slide portion in the vibration reducer shown in FIG. 11.

FIG. 12 shows a modification of the pressure-contact portion in the sixth preferred embodiment in place of the liner member 8. O-rings 13 are interposed in the pressure-contact slide portion between an elastic arm 5 and a rigid arm 12. These O-rings 13 are fitted in O-ring grooves 14 cut along the outer circumference of the free end 5a of the elastic arm 5. Accordingly, when the slide portion has been worn after an operation for a long time, it is only necessary to replace the O-rings 13.

Figure 13:
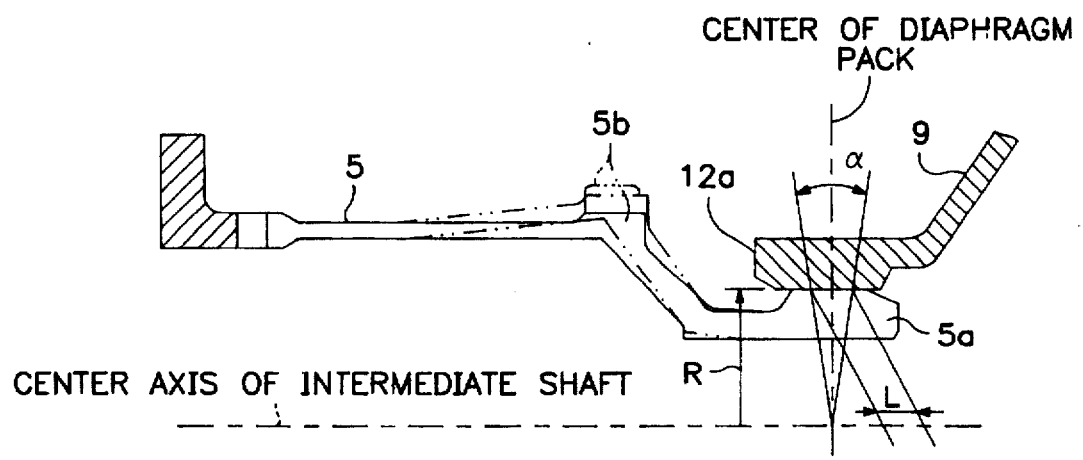
FIG. 13 is a schematic cross-section view illustrating a method for reducing a slide amount L at a contact portion.

FIG. 13 diagramatically illustrates a means for reducing a slide distance in the axial direction of the sliding at the contact portion occurring during one revolution of the shaft system while insuring centrifugal forces of the elastic arm 5, in which a radius R of the contact portion is made as small as possible. More particularly, an amount of wear and abrasion can be reduced, because the slide distance L in the axial direction of the sliding generated by a relative angular displacement becomes small. In addition, if a projected portion 5b is formed on the elastic arm 5, and the size of the projected portion is varied, it becomes possible to adjust the centrifugal forces, and thereby the pressure and the amount of wear and abrasion at the contact portion can also be adjusted.

It is to be noted that in the construction illustrated in FIG. 13, since the center of the contact portion is positioned at the center of the diaphragm pack 3 so that the relative displacement between the drive side and the driven side may consist of only the relative angular displacement, if the outer radius R of the free end 5a is set at a minimum value, then the slide distance L also becomes minimum. In addition, in order to insure centrifugal forces, the elastic arm 5 is formed to have a large diameter except at the contact portion. Owing to the fact that the slide distance L, as well as the centrifugal forces (i.e., the pressure at the contact portion), can be adjusted in the above-described manner, if the relative angular displacement α is assumed, then an amount of wear and abrasion corresponding to an operation time can be calculated. Accordingly, decisions with respect to specifications of a hardening treatment and a hard alloy liner, as well as the planning of maintenance, become easy. The above-mentioned means for reducing the slide distance while insuring centrifugal forces is effective not only with respect to the above-described contact portion subjected to hardening treatment or provided with a hard alloy liner, but also in the case of employing a liner member 8 made of rubber.

Figure 14:
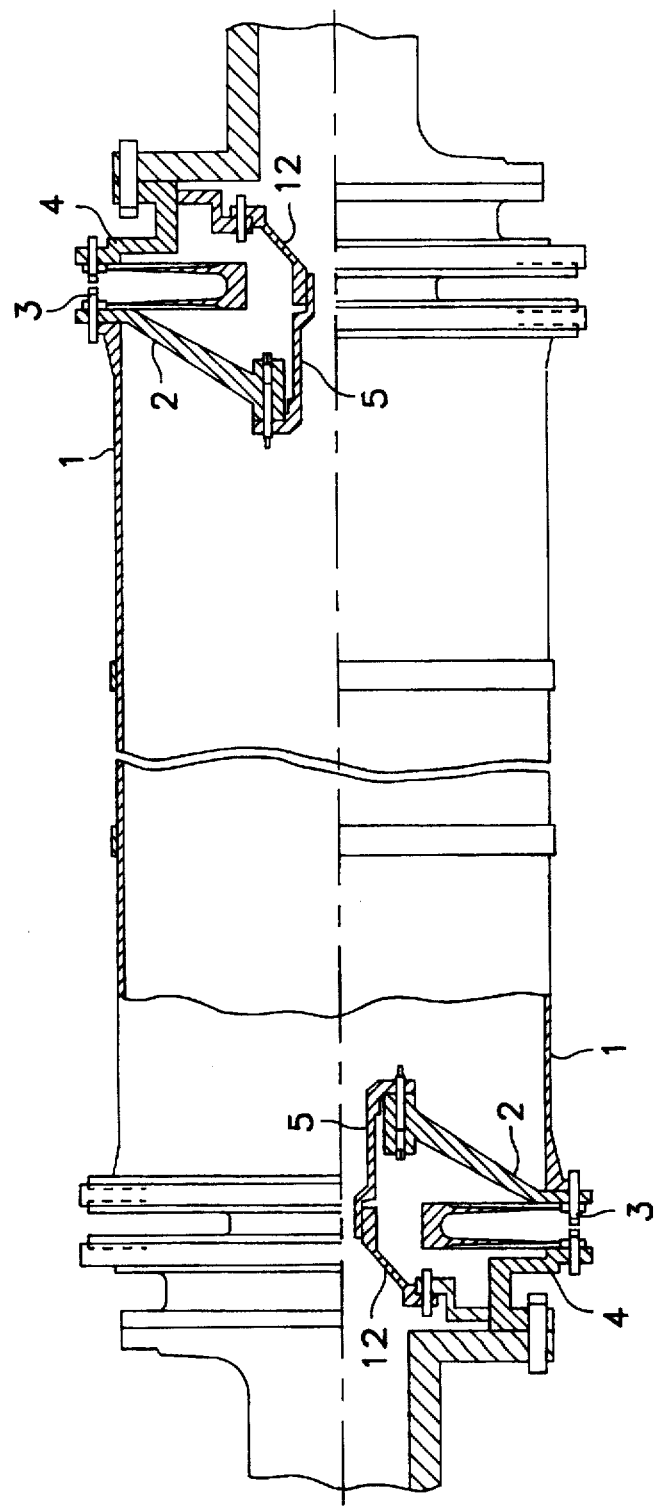
FIG. 14 is a partial cross-section view showing one example in which vibration reducers for diaphragm couplings are employed in shaft flanges on both the drive side and the driven side.

FIG. 14 shows one example of application of the present invention in which the vibration reducers for a diaphragm coupling according to the sixth preferred embodiment of the present invention illustrated in FIG. 11 and described above are provided in the shaft flanges 4 on the respective sides of the intermediate shaft 1, that is, not only on the driven shaft side but also on the drive shaft side. With such construction, although there exists some negative aspects caused by the increase in weight, the effects of this counter-measure against vibration provided by the present invention are larger than in the case where the vibration reducer is provided only on one side.

Figure 15:
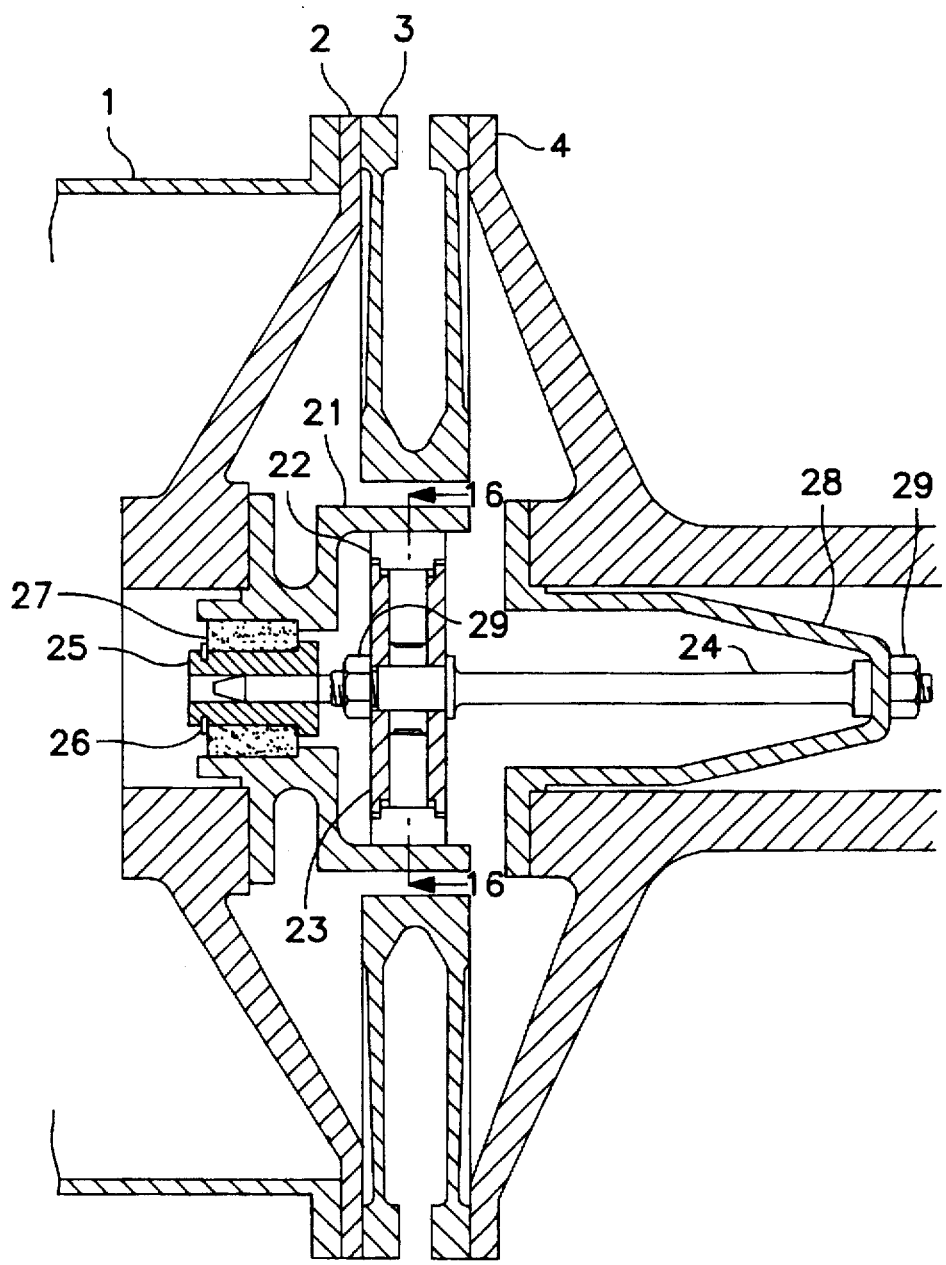
FIG. 15 is a longitudinal cross-section view of a vibration reducer for a diaphragm coupling according to a seventh preferred embodiment of the present invention.
Figure 16:
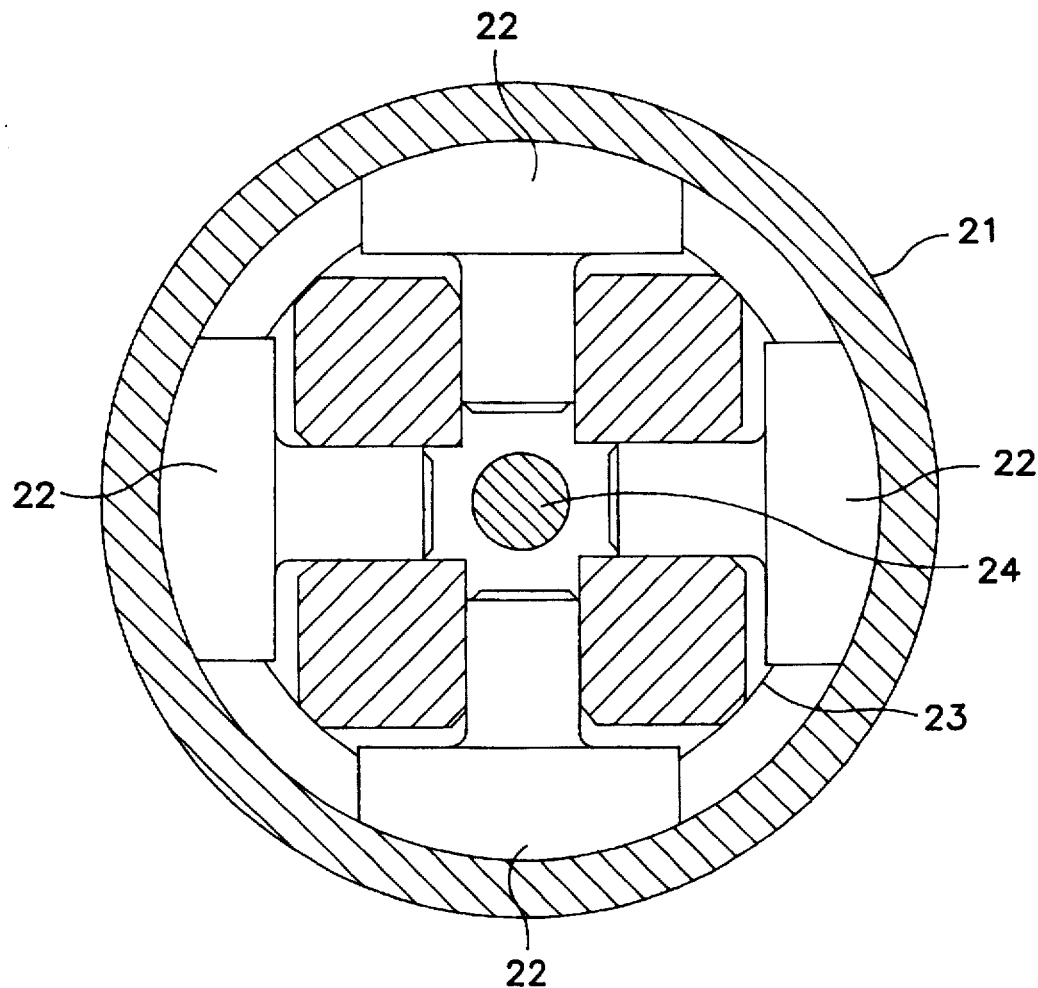
FIG. 16 is a transverse cross-sectional view taken along line J—J in FIG. 15.
Figure 17:
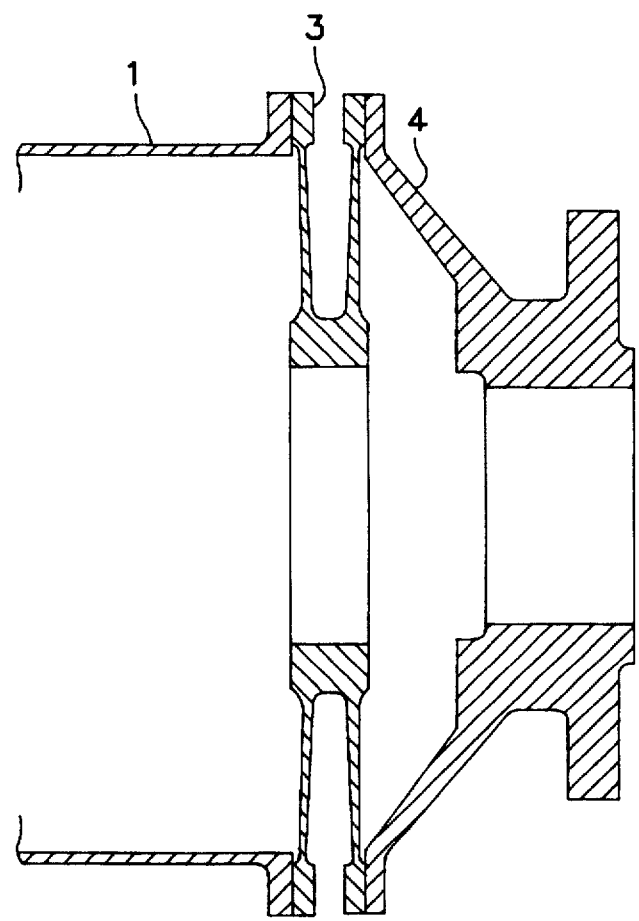
FIG. 17 is a longitudinal cross-section view showing a vibration reducer for a diaphragm coupling in the prior art.

A seventh preferred embodiment of the present invention is shown in FIGS. 15 and 16, in which a frictional cylinder 21 is mounted to a diaphragm mount flange 2 formed integrally with an intermediate shaft 1. At the center in the axial direction of a diaphragm pack 3 is supported a centrifugal weight holder 23 holding centrifugal weights 22 by means of an elongated bolt 24. One end of the elongated bolt 24 is inserted and secured into a sleeve 25. This sleeve 25 is held by the frictional cylinder 21 via a rubber liner 27 fixed by means of a thimble 26. In addition, the other end of the elongated bolt 24 is held by a shaft flange 4 of a drive shaft or a driven shaft via a bolt holder 28. It is to be noted that reference numeral 29 designates a nut.

In the following, description will be made of the operation of the vibration reducer for a diaphragm coupling according to the seventh preferred embodiment. When a shaft system connected to a marine gas turbine (not shown) rotates, the diaphragm mount flange 2, the frictional cylinder 21, the rubber liner 27 and the sleeve 25 rotate integrally, jointly with the intermediate shaft 1. In addition, since the rotation of the intermediate shaft 1 is transmitted to the shaft flange 4 via the diaphragm pack 3, the bolt holder 28, the elongated bolt 24, and the centrifugal weight holder 23, the centrifugal weights 22 also rotate. Since centrifugal forces act upon the centrifugal weights 22 rotating in the above-described manner, the centrifugal weights 22 project in the radial directions and are strongly pressed against the inner circumferential surface of the frictional cylinder 21.

When the eccentric weights 22 are brought into pressure contact with the inner circumferential surface of the frictional cylinder 21, a drive torque of the marine gas turbine become to be transmitted partly to the intermediate shaft 1 via the pressure-contact portion, and a rigidity in the axial direction corresponding to the pressing force is generated. Owing to the fact that this axial rigidity is added to the rigidity of the diaphragm pack 3, vibrations in the axial direction of the diaphragm pack 3 can be suppressed. It is to be noted that in the event that a tilt should have occurred in the diaphragm coupling, fatigue stresses would not be generated at all, because the tilt can be absorbed by the rubber liner 27 and the elongated bolt 24.

With the above-described vibration reducer for a diaphragm coupling according to the seventh preferred embodiment of the present invention, since a strong pressing force caused by centrifugal forces can be realized, a suppression effect for vibrations in the axial direction of the diaphragm coupling is improved. Various troubles such as the breaking of diaphragms, the damage of bearings caused by vibrations and an inoperable condition due to an alarm due to large vibrations can be prevented.

It is to be noted that for the rubber liners employed in the above-described respective preferred embodiments, it is preferable to use fluorine-contained rubber, or silicon-contained rubber which is generally excellent in heat-resistance and has a high mechanical strength.

As described in detail above with respect to a number of preferred embodiments according to the present invention, axial vibrations as well as torsional vibrations can be suppressed, and the following effects and advantages can be obtained:

(1) Breaking of diaphragms is prevented.

(2) It is prevented that the continuation of an operation would become impossible due to an alarm signal responsive to large vibrations.

(3) The lives of bearings (especially rolling bearings) of a shaft system including a prime mover are increased.

(4) Improvement of the reliability of the system and a reduction of maintenance expenses are achieved, because wear and abrasion of vibration reducers for diaphragm couplings are decreased, and maintenance due to wear and abrasion becomes easy.

While a principle of the present invention has been described above in connection with preferred embodiments of the invention, it is intended that all matter contained in the above description and illustrated in the accompanying drawings shall be interpreted on be illustrative and not as a limitation to the scope of the invention.

What is claimed is:

1. A coupling comprising:
   a drive shaft, a driven shaft and a diaphragm coupling disposed between and interconnecting said drive shaft and said driven shaft;
   a first flange mounted on one of said drive shaft and said driven shaft, said first flange comprising a cylindrical portion having an inner circumferential surface;
   a second flange mounted on the other of said drive shaft and said driven shaft; and
   means on said second flange for frictionally engaging said inner circumferential surface of said cylindrical portion of said first flange with pressure contact in response to centrifugal force caused by rotation of said drive shaft so as to frictionally engage said first flange with said second flange, and thus said drive shaft with said driven shaft, and for providing axial resistance to axial movement between said first flange and said second flange, and thus said shafts, while at the same time allowing relative axial movement between said shafts.

2. The coupling of claim 1, wherein said means comprises an elastic arm fixed to said second flange.

3. The coupling of claim 2, wherein said inner circumferential surface of said cylindrical portion of said first flange comprises one selected from the group consisting of a rubber liner, a hard alloy liner and a surface material subjected to hardening treatment.

4. The coupling of claim 2, wherein said elastic arm comprises an outer circumference having one selected from the group consisting of pieces of rubber, a hard alloy liner and an annular integral rubber member fixedly secured thereto for engagement with said inner circumferential surface of said cylindrical portion of said first flange.

5. The coupling of claim 2, wherein:
said diaphragm coupling has a center in the axial direction;
said inner circumferential surface of said cylindrical portion of said first flange and said elastic arm have a pressure-contact slide portion defined thereby, at which portion contact between said elastic arm and said inner circumferential surface of said cylindrical portion of said first flange takes place; and
said pressure-contact slide portion is positioned at said center of said diaphragm coupling.

6. The coupling of claim 5, wherein said elastic arm has an O-ring groove formed therein at said pressure-contact slide portion and an O-ring fitted in said O-ring groove.

7. The coupling of claim 1, wherein said means comprises:
a plurality of centrifugal weights for frictionally engaging said inner circumferential surface of said cylindrical portion when subjected to centrifugal force;
a centrifugal weight holder holding and guiding said plurality of weights;
an elongated bolt holding said centrifugal weight holder;
a sleeve fixed relative to said cylindrical portion, said sleeve holding one end of said elongated bolt; and
a bolt holder fixed relative to said second flange holding the other end of said elongated bolt.

8. The coupling of claim 7, wherein a rubber liner is interposed between said cylindrical portion and said sleeve.

9. The coupling of claim 1, wherein said means comprises a plurality of separate circumferentially spaced elastic members.

10. A coupling comprising:
a first shaft, a second shaft, a third shaft and diaphragm couplings disposed on opposite ends of said second shaft interconnecting said first shaft and said third shaft with said second shaft at said opposite ends thereof;
a first flange mounted on one of said first shaft and said second shaft, said first flange comprising a cylindrical portion having an inner circumferential surface;
a second flange mounted on the other of said first shaft and said second shaft;
first means mounted on said second flange for frictionally engaging said inner circumferential surface of said cylindrical portion of said first flange with pressure contact in response to centrifugal forces caused by rotation of said shafts so as to frictionally engage said first shaft with said second shaft, wherein said first means comprises an elastic arm fixed to said second flange;

a third flange mounted on one of said third shaft and said second shaft, said third flange comprising a cylindrical portion having an inner circumferential surface;
a fourth flange mounted on the other of said third shaft and said second shaft; and
second means mounted on said fourth flange for frictionally engaging said inner circumferential surface of said cylindrical portion of said third flange with pressure contact in response to centrifugal forces caused by rotation of said shafts so as to frictionally engage said third shaft with said second shaft and provide an axial resistance to relative axial movement of said shaft while allowing relative axial movement between said shafts, wherein said second means comprises an elastic arm fixed to said fourth flange.

11. The coupling of claim 10, wherein each said inner circumferential surface of said cylindrical portion of said first and third flanges comprises one selected from the group consisting of a rubber liner, a hard alloy liner and a surface material subjected to hardening treatment.

12. The coupling of claim 10, wherein each said elastic arm comprises an outer circumference having one selected from the group consisting of pieces of rubber, a hard alloy liner and an annular integral rubber member fixedly secured thereto for engagement with said inner circumferential surface of said cylindrical portion of said first and third flanges, respectively.

13. The coupling of claim 10, wherein:
each said diaphragm coupling has a center in the axial direction;
each said inner circumferential surface of said cylindrical portion of said first and third flanges and each respective said elastic arm have a respective pressure-contact slide portion defined thereby, at which portion contact between said elastic arms and said inner circumferential surfaces of said cylindrical portions of said first and third flanges takes place; and
each said pressure-contact slide portion is positioned at a respective said center of a respective said diaphragm coupling.

14. The coupling of claim 13, wherein at least one said elastic arm has an O-ring groove formed therein at said pressure-contact slide portion and an O-ring fitted in said O-ring groove.

15. A coupling comprising:
a drive shaft, a driven shaft and a diaphragm coupling disposed between and interconnecting said drive shaft and said driven shaft;
a first flange mounted on one of said drive shaft and said driven shaft, said first flange comprising a cylindrical portion having a cylindrical inner circumferential surface;
a second flange mounted on the other of said drive shaft and said driven shaft; and
a plurality of separate radially movable contact portions movably mounted to said second flange, said contact portions having an outer circumferential contact surface for frictional engagement with said cylindrical inner circumferential surface of said cylindrical portion, said radially movable contact portions being radially movable in response to centrifugal force due to rotation of said shafts.

16. The coupling of claim 15, wherein said radially movable contact portions comprise a plurality of circumferentially spaced elastic arms each having a fixed relative to said second flange and a free end having at a portion of said outer circumferential contact surface thereon.

17. The coupling of claim 16, wherein each of said elastic arms extends radially outwardly and in a circumferential direction from a fixed cylindrical member fixed to said second flange.

18. The coupling of claim 16, wherein each of said elastic arms extends axially from a fixed cylindrical member fixed to said second flange.

19. The coupling of claim 18, wherein each of said elastic arms comprises a projected portion projecting axially said fixed cylindrical member at a first diameter and an end portion projecting from said projected portion to said free end having a second diameter smaller than said first diameter, said free end having said portion of said outer circumferential contact surface thereon.

20. The coupling of claim 16, wherein said free ends of said elastic arms have respective outer circumferential grooves therein and an O-ring disposed in said grooves, said O-ring defining said outer circumferential contact surface.

\* \* \* \* \*